FIG. 3

Sept. 1, 1964          M. R. RONEMUS                3,147,417
        CONTROL SYSTEM FOR DRIVING AND POSITIONING AN
              OBJECT AT A PREDETERMINED LOCATION
Filed Jan. 13, 1961                        9 Sheets-Sheet 4

FIG. 4

|  |  | STATION I | FORWARD TRAVEL | FORWARD DECELERATION | FORWARD POSITION | STATION II | RETURN TRAVEL | RETURN DECELERATION | RETURN POSITION | STATION I | FORWARD TRAVEL |
|---|---|---|---|---|---|---|---|---|---|---|---|
| SWITCHES | MGS | x |  |  |  |  |  |  |  |  |  |
|  | DMS | x |  |  |  |  |  |  |  |  |  |
|  | FTS |  | x |  |  |  |  |  |  |  |  |
|  | FSDS |  |  | x |  |  |  |  |  |  | x |
|  | FPS |  |  |  | x |  |  |  |  |  |  |
|  | RTS |  |  |  |  |  | x |  |  |  |  |
|  | RSDS |  |  |  |  |  |  | x |  |  |  |
|  | RPS |  |  |  |  |  |  |  | x |  |  |
| RELAYS | MGR | x | x | x | x | x | x | x | x | x | x |
|  | DMR | x | x | x | x | x | x | x | x | x | x |
|  | FTR |  | x | x |  |  |  |  |  |  | x |
|  | SDR |  |  | x |  |  |  | x |  |  | x |
|  | FPR |  |  |  | x | x |  |  |  |  |  |
|  | RTR |  |  |  |  |  |  | x | x |  |  |
|  | RPR |  |  |  |  |  |  |  | x | x |  |
| CONTACTORS | MG1 | x | x | x | x | x | x | x | x | x | x |
|  | MG2 | x | x | x | x | x | x | x | x | x | x |
|  | MG3 | x | x | x | x | x | x | x | x | x | x |
|  | DM1 | x | x | x | x | x | x | x | x | x | x |
|  | DM2 | x | x | x | x | x | x | x | x | x | x |
|  | FT1 | x |  |  | x | x | x | x | x | x |  |
|  | FT2 |  | x | x |  |  |  |  |  |  | x |
|  | FT3 |  | x | x |  |  |  |  |  |  | x |
|  | FT4 |  | x | x |  |  |  |  |  |  | x |
|  | FT5 | x |  |  | x | x | x | x | x | x |  |
|  | SD1 | x | x |  | x | x | x |  | x | x | x |
|  | SD2 |  | x |  |  |  |  |  | x |  |  |
|  | SD3 |  | x |  |  |  |  |  | x |  |  |
|  | FP1 | x | x | x |  |  |  | x | x | x | x |
|  | FP2 |  |  |  | x | x |  |  |  |  |  |
|  | FP3 | x | x | x |  |  |  | x | x |  |  | x |
|  | FP4 | x | x | x |  |  |  |  |  |  | x |
|  | FP5 |  |  |  | x | x |  |  |  |  |  |
|  | RT1 | x | x | x | x | x |  |  |  |  | x |
|  | RT2 |  |  |  |  |  | x | x |  |  |  |
|  | RT3 |  |  |  |  |  | x | x |  |  |  |
|  | RT4 |  |  |  |  |  | x | x |  |  |  |
|  | RT5 | x | x | x | x | x |  |  |  |  |  |
|  | RP1 | x | x | x | x | x | x | x |  |  | x |
|  | RP2 |  |  |  |  |  |  |  | x | x |  |
|  | RP3 | x | x | x | x | x | x | x |  |  |  |
|  | RP4 | x | x | x | x | x | x | x |  |  | x |
|  | RP5 |  |  |  |  |  |  |  | x | x |  |

INVENTOR.
MORRIS R. RONEMUS

BY Robert H. Montgomery

ATTORNEY

INVENTOR.
MORRIS R. RONEMUS
BY Robert H. Montgomery
ATTORNEY

FIG. 8

INVENTOR.
MORRIS R. RONEMUS
BY Robert H. Montgomery
ATTORNEY

Sept. 1, 1964      M. R. RONEMUS      3,147,417
CONTROL SYSTEM FOR DRIVING AND POSITIONING AN
OBJECT AT A PREDETERMINED LOCATION
Filed Jan. 13, 1961      9 Sheets-Sheet 9

FIG. 9

| | | SYSTEM START | TOP CENTER | LOWER ELEVATOR | POSITION DOWN | RAISE ELEVATOR | POSITION UP | TOP CENTER |
|---|---|---|---|---|---|---|---|---|
| SWITCHES | MAS | × | | | | | | |
| | DCMS | × | | | | | | |
| | ELS | | × | | | | | |
| | PDS | | | | × | | | |
| | ERS | | | | | × | | |
| | PUS | | | | | | × | |
| RELAYS | MAR | × | × | × | × | × | × | × |
| | DCMR | × | × | × | × | × | × | × |
| | ELR | | | × | | | | |
| | PDR | | | | × | | | |
| | ERR | | | | | × | | |
| | PUR | | | | | | × | × |
| CONTACTORS | MA1 | × | × | × | × | × | × | × |
| | MA2 | × | × | × | × | × | × | × |
| | MA3 | × | × | × | × | × | × | × |
| | DCM1 | × | × | × | × | × | × | × |
| | DCM2 | × | × | × | × | × | × | × |
| | EL1 | | | × | | | | |
| | EL2 | | | × | | | | |
| | EL3 | × | × | | × | × | × | × |
| | EL4 | × | × | | × | × | × | × |
| | PD1 | | | | × | | | |
| | PD2 | | | | × | | | |
| | PD3 | × | × | × | | × | × | × |
| | PD4 | | | | × | | | |
| | PD5 | × | × | × | | × | × | × |
| | ER1 | | | | | × | | |
| | ER2 | | | | | × | | |
| | ER3 | × | × | × | × | | × | × |
| | ER4 | × | × | × | × | | × | × |
| | PU1 | | | | | | × | × |
| | PU2 | × | × | × | × | × | | |
| | PU3 | | | | | | × | × |
| | PU4 | | | | | | × | × |
| | PU5 | × | × | × | × | × | | |

*INVENTOR.*
MORRIS R. RONEMUS
BY *Robert H Montgomery*
ATTORNEY

United States Patent Office 3,147,417
Patented Sept. 1, 1964

3,147,417
CONTROL SYSTEM FOR DRIVING AND POSITIONING AN OBJECT AT A PREDETERMINED LOCATION
Morris R. Ronemus, Harborcreek, Pa., assignor to General Electric Company, a corporation of New York
Filed Jan. 13, 1961, Ser. No. 82,514
2 Claims. (Cl. 318—28)

This invention relates to control systems, and more particularly relates to a control system for accurately positioning an object at a predetermined location.

In many processing systems and manufacturing line operations, workpieces or workholders must be loaded or operated upon at a given work station and then transported to another work station for a subsequent operation. In many installations, it is quite important that the workpieces be quickly and accurately positioned after transport in order to be operated upon by a programmed tool or other device designed to perform a processing operation upon a workpiece in a predetermined position.

This invention is concerned with, and has as a principal object, the provision of electrical control means for moving a device a predetermined or a variable distance, and quickly and accurately positioning and holding the device at a predetermined fixed or variable location or point.

Briefly stated, the invention in one form thereof comprises a new and improved control system for an electric motor which drives a carriage a predetermined distance by first accelerating the motor to a predetermined speed from a first control signal to rapidly move the carriage toward a predetermined position, decelerating the motor, and shifting control of the motor to a device furnishing a positioning signal having a null occurring at the predetermined position, as the motor decelerates to halt the motor and therefore the driven carriage at the predetermined position. The positioning device is further effective to sense any deviation of the carriage from the predetermined position and cause the motor to exert a torque to correct such deviation.

The novel features of the invention are pointed out with particularity in the appended claims. The invention itself, however, together with further objects and advantages thereof, may best be understood from the following description, taken in conjunction with the drawings wherein:

Figure 1:
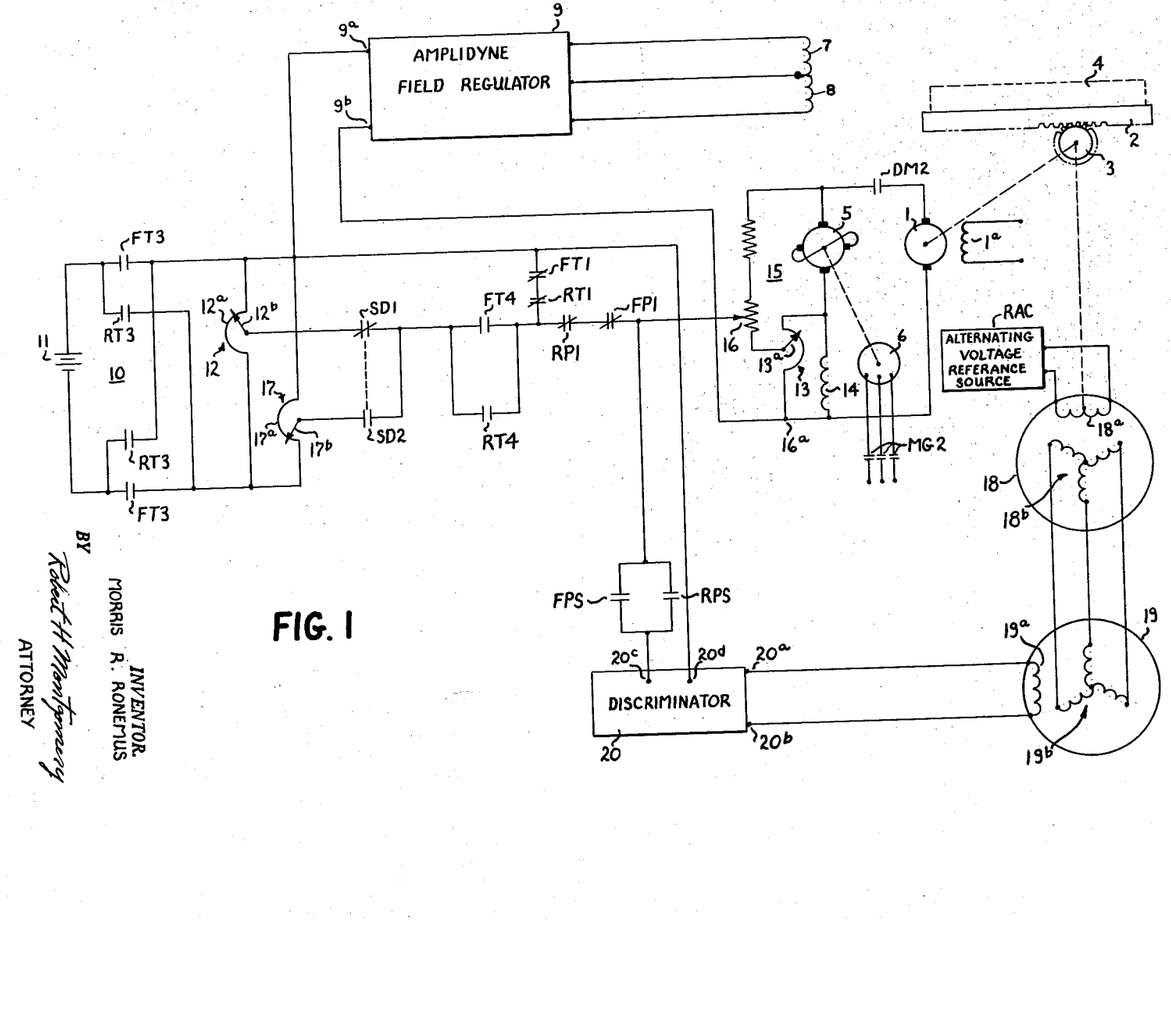
FIGURE 1 illustrates, partially in block form, a positioning control system embodying the invention.

Referring now to FIG. 1, I show a direct current (D.C.) motor 1 driving a rack 2, through a pinion 3, connected to the motor shaft. The rack 2 is adapted to carry or drive a carriage, workpiece or workpiece holder 4. The armature of motor 1 is supplied electrical energy from a controllable power amplifier furnishing reversible unidirectional energy such as an amplidyne 5 driven by a motor 6 which is energized from a suitable source, not shown, through contactors MG2. The motor 1 as shown is separately excited by motor field winding 1a at a constant voltage from a source not shown. The forward and reverse field windings 7 and 8 respectively of the amplidyne determine the direction and magnitude of the amplidyne output, and hence the direction and speed of rotation of motor 1. Energization of field windings 7 and 8 is regulated by field regulator or amplifier 9 in response to a speed error signal applied across regulator input terminals 9a and 9b. The speed error signal is derived from a comparison of a speed reference signal and a motor speed feedback signal, as hereinafter pointed out. The regulator 9 comprises a push-pull type amplifying device which selectively controls the excitation of field windings 7 or 8 in response to the magnitude and polarity of an input signal. A suitable regulator is illustrated in Patent 2,537,770, assigned to the same assignee as the present application.

A motor speed reference voltage source 10 comprises a constant voltage source represented by a battery 11 reversibly connectable, through contactors FT3 and RT3, across a speed reference potentiometer 12 having a resistance portion 12a and a contact arm 12b. As will be apparent, the setting of arm 12b on resistance portion 12a will determine motor speed when the resistance portion 12a is connected across voltage source 11 and arm 12b is connected to the regulator 9.

To regulate motor speed, the speed reference signal is compared with a motor speed feedback signal, which may be developed by measuring the counter electromotive force (E.M.F.) of the motor. In the illustration, a potentiometer 13 having a contact arm 13a is connected across a commutating field 14 of amplidyne 5, and the voltage across the potentiometer is a measure of motor armature current. Voltage divider 15 is connected across one side of the armature of motor and contact arm 13a. The voltage across points 16 and 16a is thus proportional to motor armature voltage minus motor IR drop, and hence motor counter E.M.F. and speed. The voltage across points 16 and 16a is compared in opposition with a voltage reference signal; e.g., the voltage at arm 12b, and the resultant voltage is the speed error voltage applied across regulator input terminals 9a and 9b. Point 16 is connectable to arm 12b through contactors SD1, FT4, RP1 and FP1, as hereinafter described. If desired, the motor speed feedback signal may be derived from a tachometer driven by the motor.

The portion of the system so far described comprises a basic motor speed regulator well known to the art, and while it is adaptable in the practice of this invention, other motor speed regulating systems may be utilized in practicing the invention. It is preferred that either the motor power amplifier be capable of accepting regenerative power or other means be provided for dynamically braking the motor to quickly decelerate the motor as it drives the rack 2 toward a predetermined position.

In accordance with the invention, I provide means to generate a cyclic signal having a magnitude related to the instantaneous position of carriage 4. As the carriage 4 is driven towards a selected position, the amplidyne 5, and hence motor 1, are placed under control of the generated signal which is applied to the regulator 9 to control the amplidyne output to zero to decelerate the motor to zero to bring the carriage to rest at the selected position. Means are provided for deriving a second speed reference signal which comprises potentiometer 17 having a resistance portion 17a connected across constant voltage source 11 and a contact arm 17b which is set for a lower voltage value than contact arm 12b, as hereinafter explained.

Driven by pinion 3, and hence the shaft of motor 1, is a selsyn unit 18 having a rotor member, not shown, with winding 18a thereon excited from a reference source of alternating voltage RAC. The term "selsyn" describes a machine, well known in the art, wherein a winding on a first selsyn member (rotor) when energized with an alternating voltage induces a voltage in windings on the stator of a magnitude proportional to the displacement of the rotor with respect to a reference position. Upon rotation of winding 18a, voltages are induced in windings 18b which are proportional in magnitude to the position the rotor with respect to stator windings 18a. In this disclosed embodiment of the invention, the number of rotations of the selsyn rotor is chosen to be an integer for a selected length of transport of carriage 4, as hereinafter explained.

Figures 2, 7:
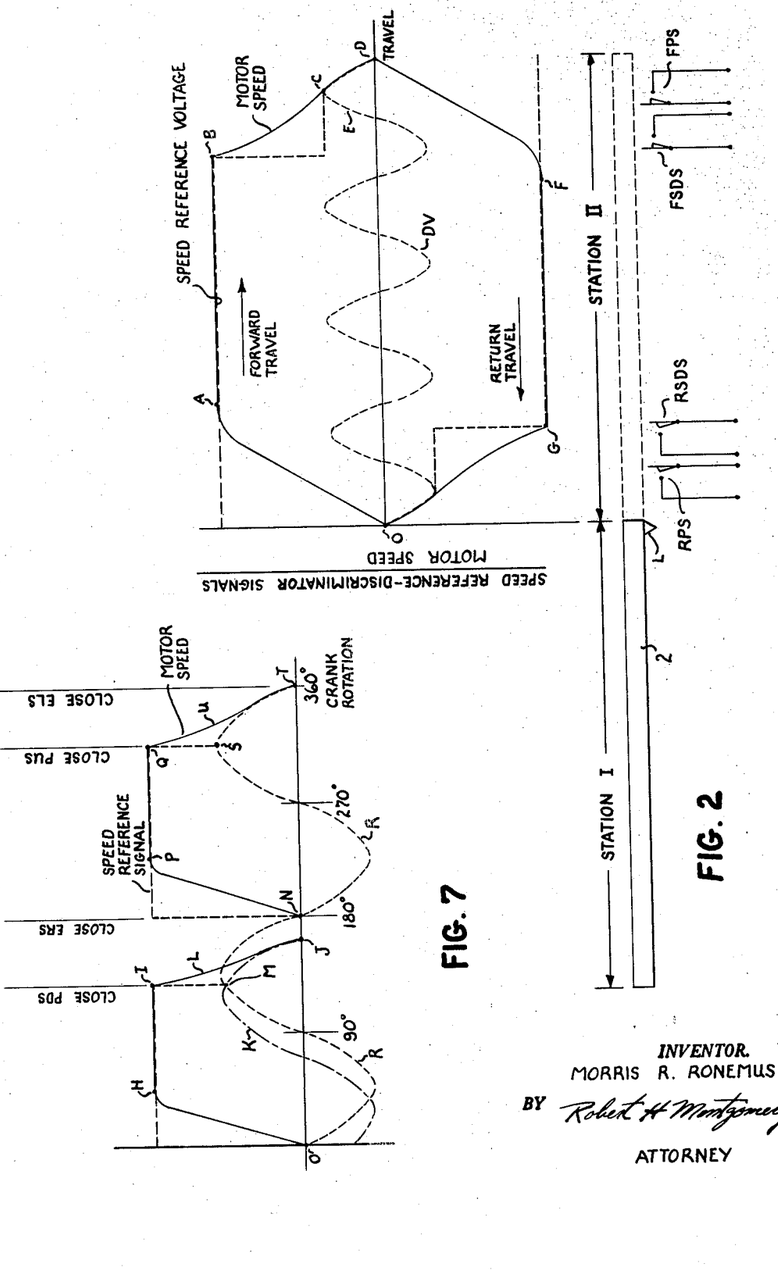
FIGURE 2 graphically illustrates operation of the system of FIG. 1.
FIGURE 7 graphically illustrates operation of the system of FIGURE 6.

The voltage generated in windings 18b upon displacement of the rotor of selsyn 18 from a reference position with respect to the stator windings 18b, has a sinusoidal wave form varying in magnitude with rotation of the rotor of selsyn 18. The voltage generated in windings 18b is transmitted to a similar selsyn unit 19. However, the rotor member, not shown, of selsyn 19 having winding 19a thereon is rendered non-rotatable and the voltage transmitted to windings 19b from windings 18b induces by transformer action a voltage in rotor winding 19a. The voltage induced in winding 19a has a sinusoidal wave form varying in magnitude with the displacement of the rotor of selsyn 18, and the envelope of the voltage induced in winding 19a is indicative in magnitude of the displacement of the rotor of selsyn 18. The discriminator 20 to which the voltage induced in winding 19a is applied provides an output voltage related to the envelope of the voltage induced in winding 19a. The discriminator output voltage varies cyclically with the position of the rotor of selsyn 18 and has a wave form as indicated at DV, FIG. 2. The number of rotations of the rotor of selsyn 18 is chosen by suitable gearing to be an integer for the selected length of travel of the carriage 4, and to have a null at the predetermined stopping position of the carriage 4. In FIG. 2 it will be noted that all cycles of discriminator output wave DV are illustrated as having equal width, and this condition is valid with respect to length of travel. However, it will be apparent that with respect to time, the cyclic output of the discriminator will vary in duration inasmuch as the speed of carriage 4 is not constant for its entire length of travel.

The output of the discriminator is connectable through contactor FPS or RPS to the input terminals 9a and 9b of regulator 9 and the motor speed voltage at point 16. The magnitude of the cyclic output of the discriminator 20 is continuously indicative of the carriage position throughout its travel, and since the discriminator output voltage in the illustrated embodiment of the invention is chosen to zero at the desired carriage positions, by placing the motor under the control of the positioning system as it is decelerated, the carriage is accurately positioned after a predetermined length of travel which corresponds to a null point in the discriminator output voltage.

Figure 3:
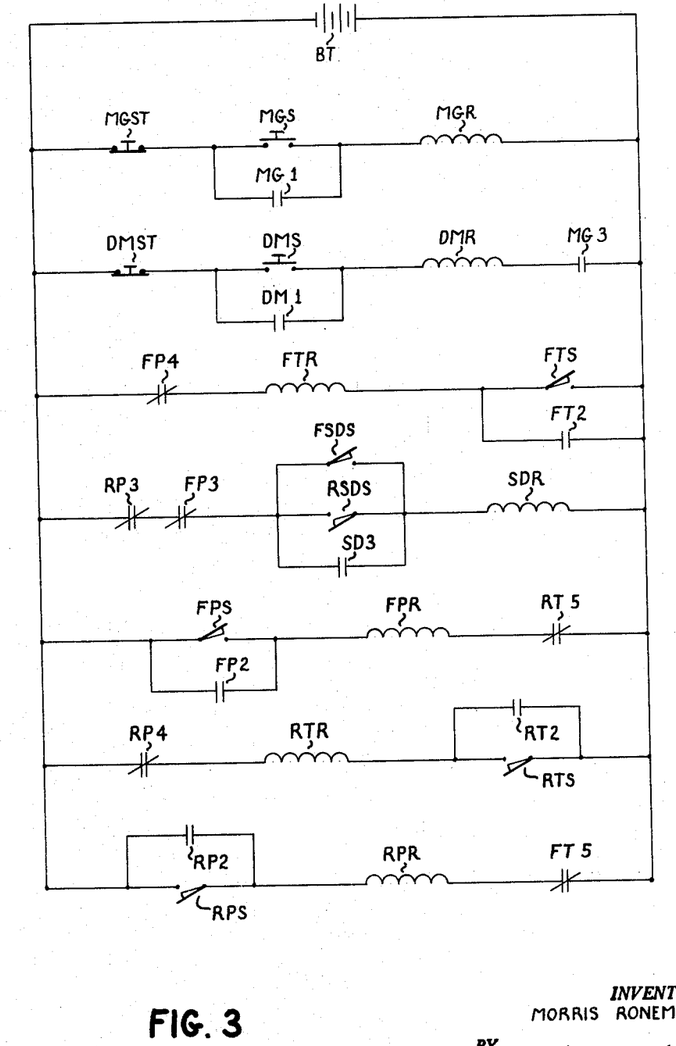
FIGURE 3 shows a control sequencing network which may be utilized in conjunction with the system of FIGURE 1.
Figure 4:
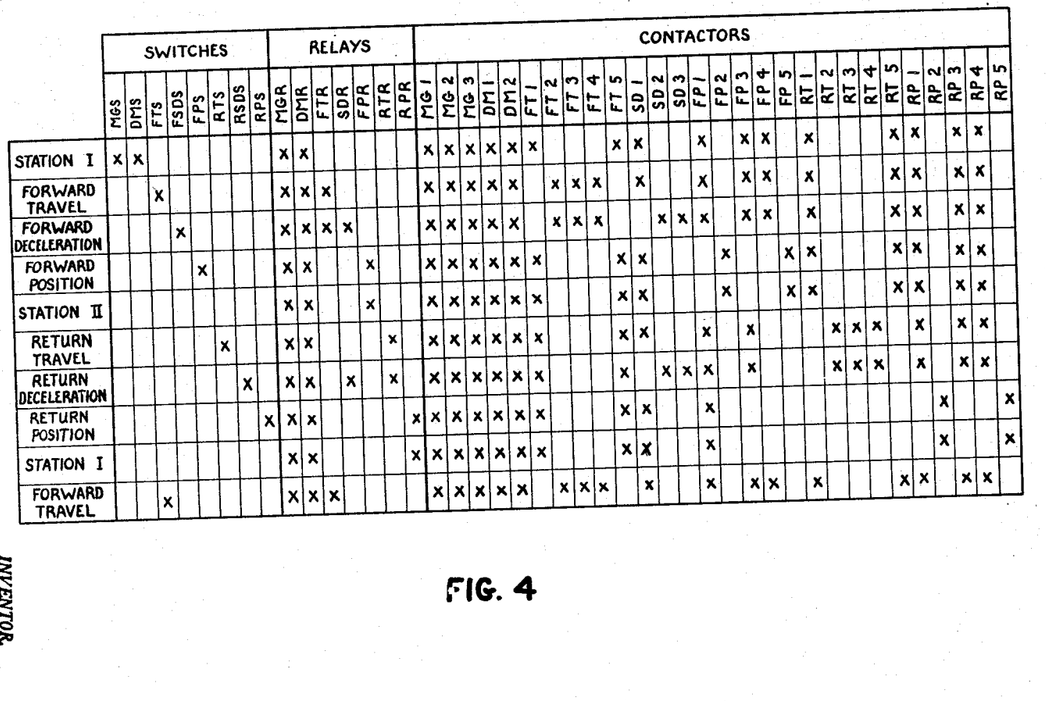
FIGURE 4 is a chart showing the operating sequence of switches, relays and contactors of FIGURES 1 and 3.

To aid in explaining the operation of the system, reference is made to FIG. 2, which graphically illustrates the relationship of reference voltages, discriminator voltage, motor speed, and length of travel of carriage 4; FIG. 3, which illustrates a sequencing control circuit usable in the illustrated embodiment of the invention; and the relay, switch and contactor sequencing chart of FIG. 4, which tabulates the operation of the circuits of FIGS. 1 and 3. In FIG. 1 the contactors are shown in positions assumed when their controlling relays are de-energized, and when the carriage 4 is located at its initial position, hereinafter referred to as Station I, before the system is energized. The illustrated actuating relays and associated contactors bear like identifying letters. For example, the forward travel switch is represented as FTS, the forward travel relay is represented as FTR, and contactors controlled by relay FTR are designated FT. In FIG. 3, a battery BT is illustrated as providing an energizing source for the relays in the circuit of FIG. 3. In the sequencing chart of FIG. 4, the mark "X" indicates when a particular relay is energized, or when a particular contactor or switch is closed.

To commence operation, start switch MGS is closed, which energizes relay MGR to pick up contactors MG1, MG2 and MG3 to lock in relay MGR and energize motor 6, which drives amplidyne 5. This condition will be sustained until stop switch MGST is opened to de-energize relay MGR, and hence motor 6.

The D.C. motor start switch DMS is then closed, start relay DMR is energized to close contactor DM1, locking in relay DMR, and contactor DM2 connecting the motor 1 across amplidyne 5. This condition is sustained until D.C. motor stop switch DMST is opened, or switch MGST is opened to cause contactor MG2 to drop out.

At this point, points 16 and 16a are connected through contactors FT1, RT1, RP1 and FP1 to the regulator input 9a. Thus, the motor speed feedback voltage source is connected across the regulator input to prevent any incipient energization of the amplidyne fields which would cause a driving signal to be applied to motor 1, and since the motor speed is zero there is zero input across regulator terminals 9a and 9b.

Upon a given signal or happening, forward travel switch FTS is closed to energize forward travel relay FTR. Relay FTR picks up contactor FT2 to lock itself in and also picks up contactors FT3 and FT4 and drops out contactor FT1 to connect arm 12b of potentiometer 12 to tap 16, and hence apply the speed reference voltage at arm 12b in series with the motor speed feedback signal across the input terminals 9a and 9b of regulator 9. This connection excites forward field 7 of amplidyne 5 which delivers power to motor 1, which is accelerated as represented by line OA, FIG. 2. The motor 1 then runs at its regulated speed, as represented by line AB, FIG. 2, and drives carriage 4.

The position of the carriage is then sensed at a predetermined point (point B, FIG. 2) and the motor is caused to decelerate. The sensor illustrated is forward switch FSDS, which may be closed at a predetermined point by carriage 4 or rack 2. In FIG. 2 a lug or detent L on rack 2 is illustrated as the actuator of switch FSDS. Closing of FSDS energizes slow down relay SDR, which picks up contactor SD2 and drops out contactor SD1 to connect arm 17b of potentiometer 17 to the input of regulator 9. Contactor SD3 is also closed to lock in relay SDR. Arm 17b is at a lower speed reference potential than arm 12b, as illustrated in FIG. 2. Inasmuch as arm 17b is at a lower potential than arm 12b, excitation of amplidyne field 7 is decreased and motor 1 begins to decelerate and acts as a generator to supply regenerative power to amplidyne 5 to thereby dynamically brake motor 1. Motor speed falls, as indicated by line BC, FIG. 2. The magnitude of the reference voltage at arm 17b is chosen to be substantially equal to the maximum output voltage of discriminator 20, for reasons hereinafter discussed.

As the carriage approaches the desired position, another sensing device, forward position switch FPS, is closed by lug L, FIG. 2. Closing of switch FPS energizes forward position relay FPR, which picks up contactor FP2 to lock in relay FPR; contactor FP3 is dropped out, which de-energizes relay SDR causing contactor SD2 and SD3 to drop out and contactor SD1 to be picked up; contactor FP4 is dropped out to de-energize relay FTR which drops out contactors FT3 to isolate the reference voltage source from the input of regulator 9 and contactor FT1 is picked up; contactor FP1 is opened and contactor FP5 is closed to connect the output terminals 20c and 20d of discriminator 20 in series with tap 16 across the input terminals 9a and 9b of regulator 9 to place the regulator under the control of the discriminator signal.

The last-described control transition is accomplished at or after the last negative maximum of the discriminator voltage to ensure control transfer to the discriminator (see FIG. 2) at a point prior to the desired null in discriminator output and subsequent to a point where the motor might stop the motor before the desired position is reached (a prior null point of discriminator voltage). The lower speed reference signal at arm 17b is provided substantially equal to maximum discriminator output voltage DV to further ensure that the discriminator signal should not position the carriage at a prior null point in discriminator output. The lower magnitude speed reference signal is provided to ensure proper control transfer to the discriminator signal and is not considered a critical necessity. As half cycle E, FIG. 2, of the discriminator signal DV reaches zero volts at the desired position, point D, the amplidyne output also reaches zero, and the carriage is stopped at the predetermined position.

If for any reason the carriage should overshoot the predetermined position, the discriminator output will be caused to reverse by virtue of the voltage induced in windings 18b of selsyn transmitter 18 in response to the overtravel, and the reverse field 8 of amplidyne 5 will be energized causing the amplidyne output to be reversed to return the carriage until the carriage is positioned at the discriminator output null, point D, FIG. 2. In this manner the carriage is electrically held at the predetermined position. Otherwise stated, the positioning system will produce a torque in opposition to any force tending to move the positioned carriage 4.

The regulator input terminals are now connected across only the motor speed voltage source and the discriminator output, and since the motor speed is zero, as is the discriminator output, the input to regulator 9 is zero; hence, there will be no field on the amplidyne and therefore no amplidyne output unless the carriage 4 is moved from the predetermined position.

The carriage 4 has now been positioned at a predetermined location, referred to as Station II. After a predetermined time, or after an operation has been performed on carriage 4 or workpieces carried therein, the carriage 4 may be returned to Station I. Return travel is the reverse of forward travel and is initiated by closing return travel switch RTS. This may be done by a remote timing device, not shown, or may be caused by a signal from some sensing device, not shown, indicating that the operation upon carriage 4 or workpieces therein has been completed.

When return travel switch RTS is closed, return travel relay RTR is energized, contactor RT1 is opened, contactor RT2 closes to lock in relay RTR, contactors RT3 and contactor RT4 are closed to connect the speed reference signal at potentiometer arm 12b to the input of regulator 9; contactor RT5 is dropped out, de-energizing relay FPR, then contactor FP1 picks up, contactor FP2 drops out and contactor FP3 picks up, contactor FP4 picks up, and contactor FP5 drops out, disconnecting discriminator 20 from regulator 9.

This provides the same circuit as when switch FTS was closed, as heretofore described, except that the polarity of the reference voltage source is reversed, and therefore reverse field 8 of amplidyne 5 is now energized for return travel. The excitation of amplidyne field 8 through regulator 9 reverses the output of amplidyne 5 with respect to forward travel of carriage 4 and the motor 1 is accelerated as represented by line DF, FIG. 2 to a speed determined by the setting of arm 12b of potentiometer 12, and then runs at regulated speed, illustrated by line FG, FIG. 2. At point G, lug L closes return slow down switch RSDS, which causes relay SD to be energized to drop out contactor SD1 and pick up contactor SD2 to transfer control to the lower reference voltage at arm 17b of potentiometer 17. Contactor SD3 is also picked up to lock in relay SDR.

As motor 1 decelerates from point G, at a predetermined point, return position switch RPS will be closed to cause energization of relay RPR; contactor RP1 will be dropped out, contactor RP2 will pick up to lock in relay RPR; contactor RP3 will drop out to de-energize relay SDR; contactor RP4 drops out to de-energize relay RTR which drops out contactors RT3 to isolate the reference voltage source from regulator input terminals 9a and 9b and contactor RPS picks up to connect the discriminator signal in series with the motor speed voltage across regulator input terminals 9a and 9b. As the discriminator signal approaches zero at point 0, FIG. 2, the motor speed follows reaching zero at the null point of the discriminator output signal. Any contactor actuation not discussed will be apparent upon inspection of FIG. 4.

The cycle is then repeated by closing forward travel switch FTS, which may be closed by a timing devices or other remote means, not shown, to initiate a new cycle.

Figure 5:
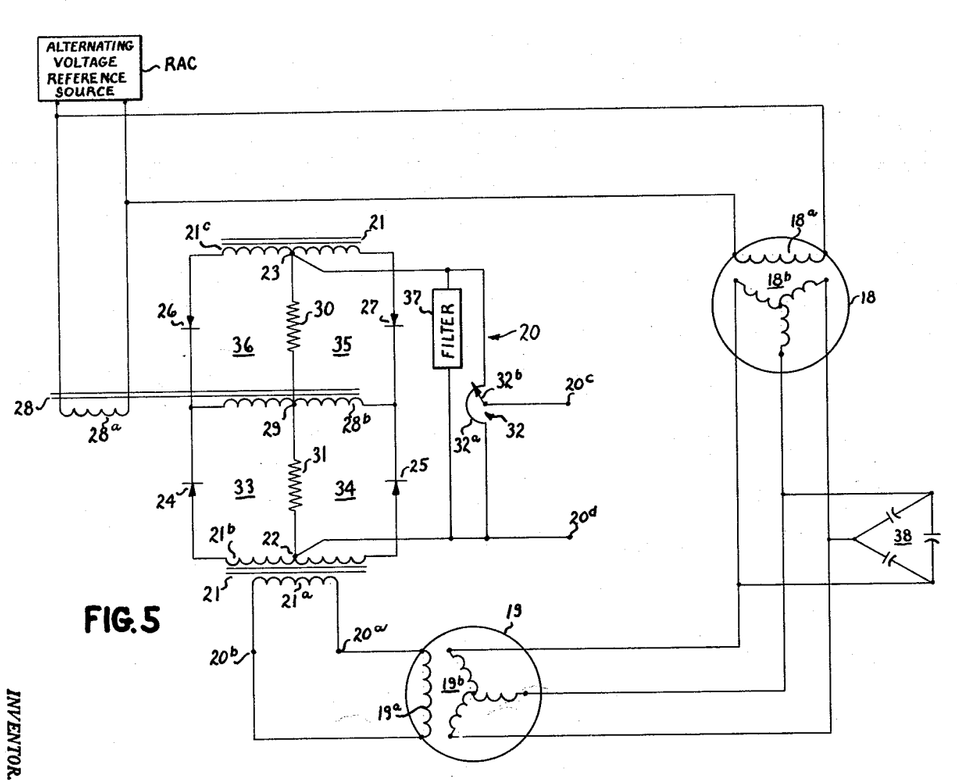
FIGURE 5 is a schematic diagram of a selsyn discriminator network used in FIGURE 1.

The discriminator which provides the cyclic positioning control signal is shown schematically in FIG. 5. The discriminator 20 receives an alternating input signal varying in magnitude with displacement of the rotor of selsyn 18 caused by travel of carriage 4. The function of the discriminator is to provide a voltage related to the envelope of voltage induced in winding 19a. The discriminator 20 comprises a selsyn signal input circuit comprising transformer 21, having a primary 21a connected across terminals 20a and 20b, and secondaries 21b and 21c having center taps 22 and 23 respectively. Secondary 21b feeds unidirectional conducting devices such as diodes 24 and 25. Secondary 21c feeds diodes 26 and 27. A transformer 28 having a primary 28a and a secondary 28b with center tap 29 is provided with the secondary 28b connected between the cathodes of diodes 24 and 26 and the cathodes of diodes 25 and 27. Connected between center taps 23 and 29 and center taps 22 and 29 are resistances 30 and 31 of equal resistance values. The voltage appearing across series resistors 30 and 31 is the discriminator output which may be applied across resistance portion 32a of potentiometer 32. The desired magnitude of the discriminator output signal may be achieved by selecting the position of potentiometer arm 32b on resistance portion 32a. The discriminator output is then taken from terminals 20c and 20d.

It will be noted that the discriminator 20 provides four circuit loops 33, 34, 35 and 36. Loops 33 and 34 include resistance 31, and loops 35 and 36 include resistance 30. The polarities of secondary windings 21b and 21c are so selected that an alternating voltage applied to primary winding 21a will act to cause current to flow in loops 34 and 36 during one half cycle and in loops 33 and 35 during the other half cycle.

The reference voltage which is induced in winding 28b will alternately aid current flow in one loop (33 or 35) and back bias the diode of the complementary loop (34 or 36). Additionally, the reference voltage induced in winding 28b will cause current flow in the resistor included in the loop including the back-biased diode. The currents in resistors 30 and 31 are then in opposite directions and of unequal magnitude in the resistances 30, 31 of equal resistance value. Therefore, a net unidirectional voltage appears across center taps 22 and 23, and hence resistance portion 32a of potentiometer 32. This net unidirectional voltage is smoothed to provide a wave shape related to the envelope of the discriminator input voltage at terminals 20a and 20b.

Figure 5A:
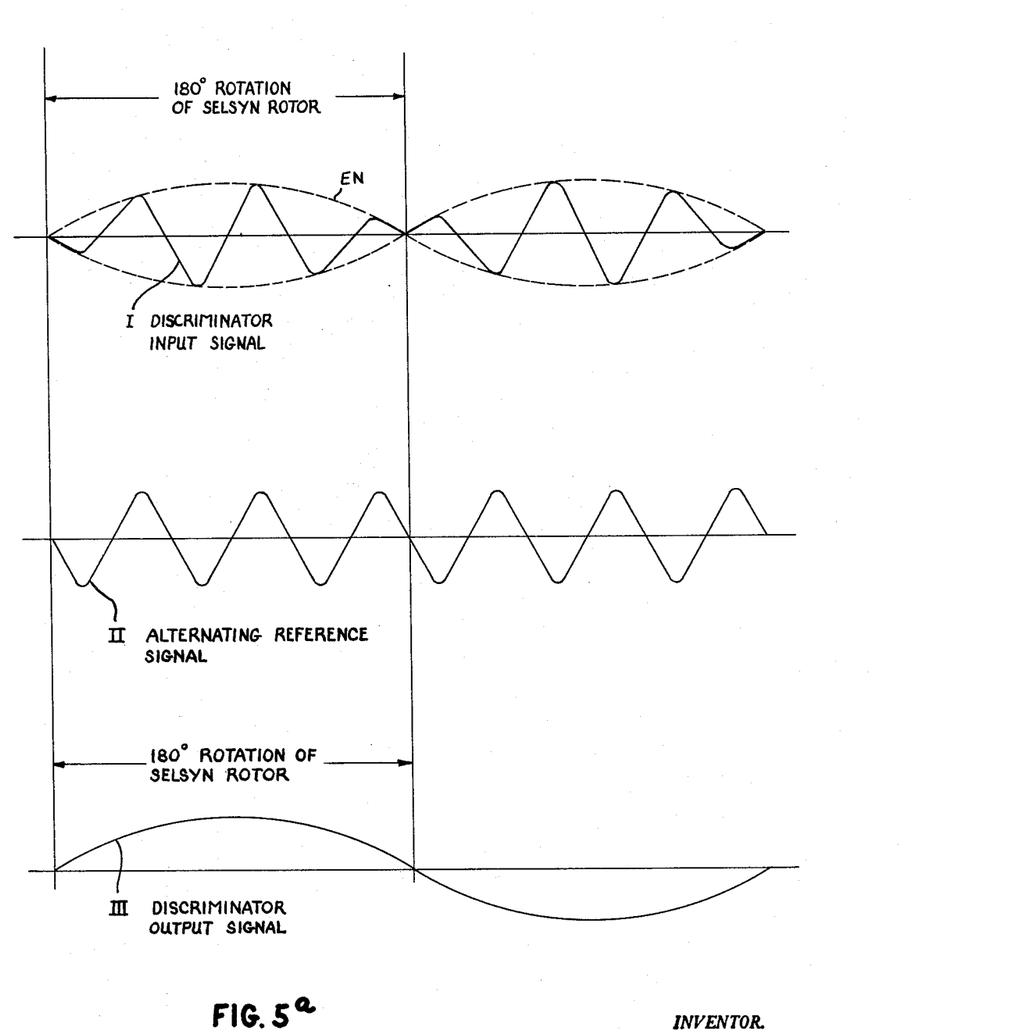
FIGURE 5a illustrates discriminator wave forms.

Reference is now made to FIG. 5a, which shows the relationship of discriminator 20 input voltage, I, reference voltage, II, and discriminator output voltage at terminals 20c, 20d, III. It will be seen that the input voltage defines an envelope EN, and since the input voltage is varying in magnitude with the position of the rotor of selsyn 18, the envelope is indicative in magnitude of the position of the rotor of selsyn 18 with respect to its stator. It will be further seen that the discriminator input voltage reverses phase for every 180° rotation of the rotor of selsyn 18. Therefore, during a first 180° rotation of the rotor of selsyn 18, the net unidirectional voltage will be in one direction and will change direction for the next 180° of rotation of the rotor of selsyn 18. This produces the cyclic discriminator output wave III, which is related to the envelope of input voltage I. Therefore, the output signal of discriminator 20 is continuously indicative in magnitude (and also phase angle) of the position of carriage 4 as it is driven by motor 1.

The filter network 37 removes fluctuations tending to appear in discriminator output voltage due to the higher frequency alternating reference voltage. In the illustration of FIG. 5a, the frequency of the alternating reference voltage bears no specific relationship to the discriminator output voltage, but is shown only by way of example.

Therefore, when the rotor of selsyn 18 is selected to have a given number of revolutions for a predetermined length of travel of carriage 4 and rack 2, the instantaneous magnitude and phase angle of the discriminator output signal is related to the instantaneous position of carriage 4, and by selecting a predetermined phase angle (or magnitude during a given cycle) of the discriminator output signal as a reference point (here illustrated as a null), the carriage 4 may be positioned at that phase angle of the discriminator output signal. In order to prevent any possible phase shift in the signal generated in selsyn 18, due to loading thereof, capacitor network 38 may be provided.

Figure 6:
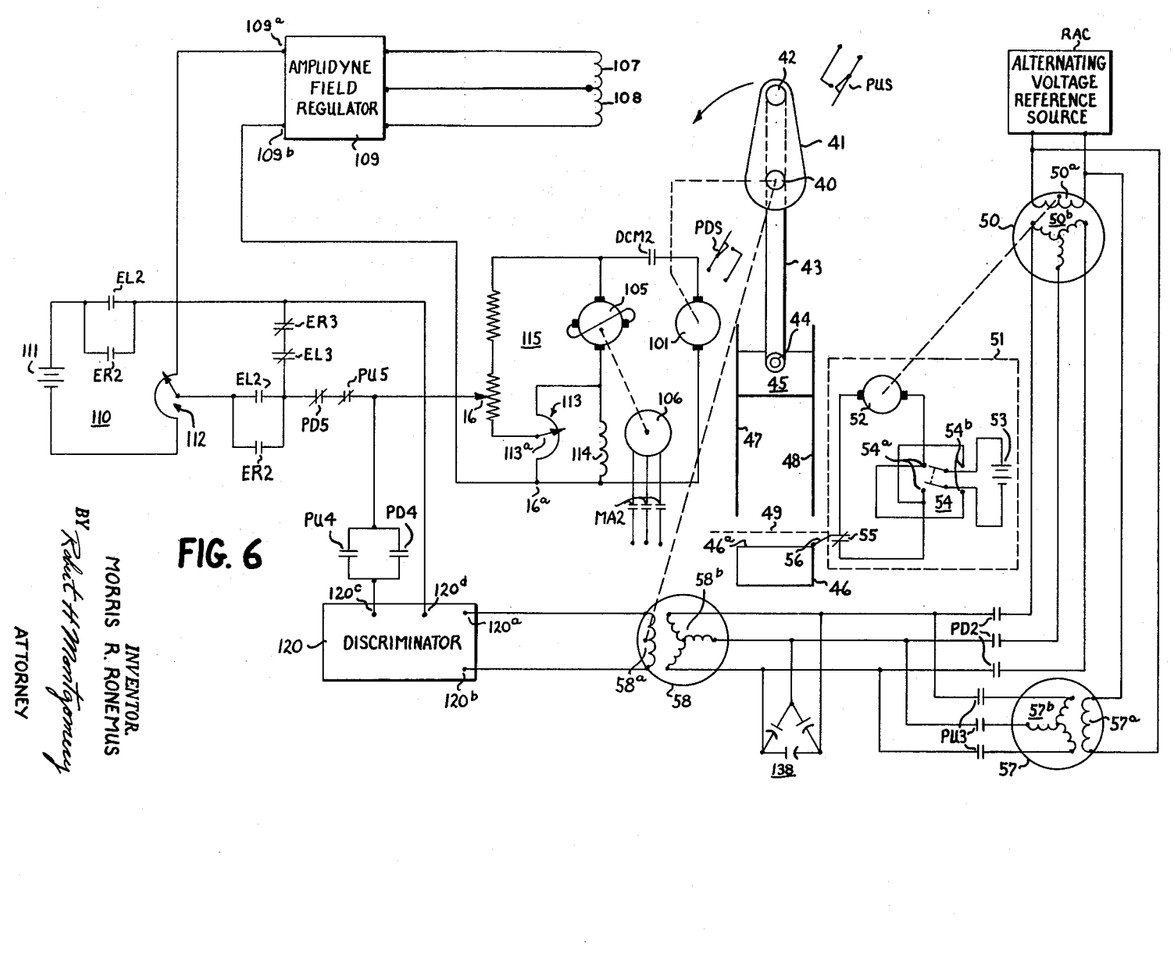
FIGURE 6 illustrates a second positioning control system embodying the invention.

The invention is applicable for positioning an object at a predetermined variable location and a system for such application embodying the invention is shown in FIG. 6. This embodiment is disclosed as controlling the vertical positioning of an elevator which may be a tool, tool holder, or other object which it is desired to move in a vertical plane. In FIG. 6, elements corresponding to elements of FIG. 1 bear corresponding identifying numerals plus one hundred. In FIG. 6, it will be seen that the motor speed regulator is the same as that disclosed in FIG. 1. However, the contactor arrangement in FIG. 6 is slightly different.

The motor 1 drives a shaft 40 to which is geared an elevator crank 41. Pivotally connected to one end of the crank 41 at point 42 is a link 43 which pivotally carries at point 44 an elevator 45 which may be a tool, tool carrier, or some other device designed to perform an operation on a workpiece 46. The elevator 45 moves vertically in guides represented by the lines 47 and 48. In order to best explain this embodiment of the invention, it will be assumed that the surface 46a of object 46 to be operated upon may vary in distance from a reference plane 49. It is then necessary to sense the distance of the surface 46a from the reference plane 49 before lowering elevator 45 to operate upon object 46. This length may be sensed by a suitable measuring device which will then position the rotor, not shown, of a selsyn unit 50 having winding 50a thereon, in accordance with the distance between surface 46a and reference plane 49.

One device which may be used for accomplishing this is the depth-sensing device 51 which comprises a motor 52 driveably connected to the rotor, not shown, of selsyn 50 having winding 50a thereon. The motor 52 is energized from a suitable source represented by battery 53 in a circuit comprising the motor 52, battery 53, a reversing switch 54 adapted to close on either forward contacts 54a or reverse contacts 54b, and a position-sensing switch or contactor 55 with a probe 56. When an object 46 to be operated upon is placed beneath the elevator 45, the switch 54 is closed on terminals 54a to energize the motor. The device 51, which is vertically moveable by means not shown, is then lowered at a predetermined constant rate until the probe 56 contacts surface 46a, which opens contactor 55 to stop motor 52. It will be seen that when the device 51 is lowered a predetermined distance until probe 56 contacts surface 46a, the motor 52 turns the rotating winding 50a of selsyn unit 50. Thus, the distance traveled by the device 51 causes a proportional rotational displacement of winding 50a of selsyn unit 50. The winding 50a is excited from a source of A.C. reference voltage RAC. Also provided is a reference selsyn 57 having a rotor winding 57a and stator winding 57b. The rotor winding 57a of selsyn 57 is non-rotative. The stator windings 50b and 57b of selsyns 50 and 57 respectively are selectively connectable through contactors PD2 and PU3 respectively to the stator windings 58b of a selsyn unit 58. The rotor of selsyn 58 with winding 58a thereon is driveably connected to the shaft 40.

The connection between shaft 40 and the rotor of selsyn 58 is so selected that the selsyn 58 is rotated an even integral number of rotations per revolution of crank 41, and therefore the output of the discriminator 120 is normally at a null at both top and bottom center. However, by displacing the position of the rotor of selsyn 50 in accordance with the position of the surface 46a from reference plane 49, the output signal of the discriminator 120 (identical to discriminator 20, FIG. 5) will be phase-shifted in accordance with the initial displacement of the rotor of selsyn 50 and therefore the null point of the discriminator output signal normally occurring at the bottom center position of elevator 45 will be shifted by a phase angle proportional to the displacement of the rotor of selsyn 50. Rotor windings 50a and 57a of selsyns 50 and 57 are energized from a common alternating voltage source, which also supplies the reference voltage to discriminator 120.

Figure 8:
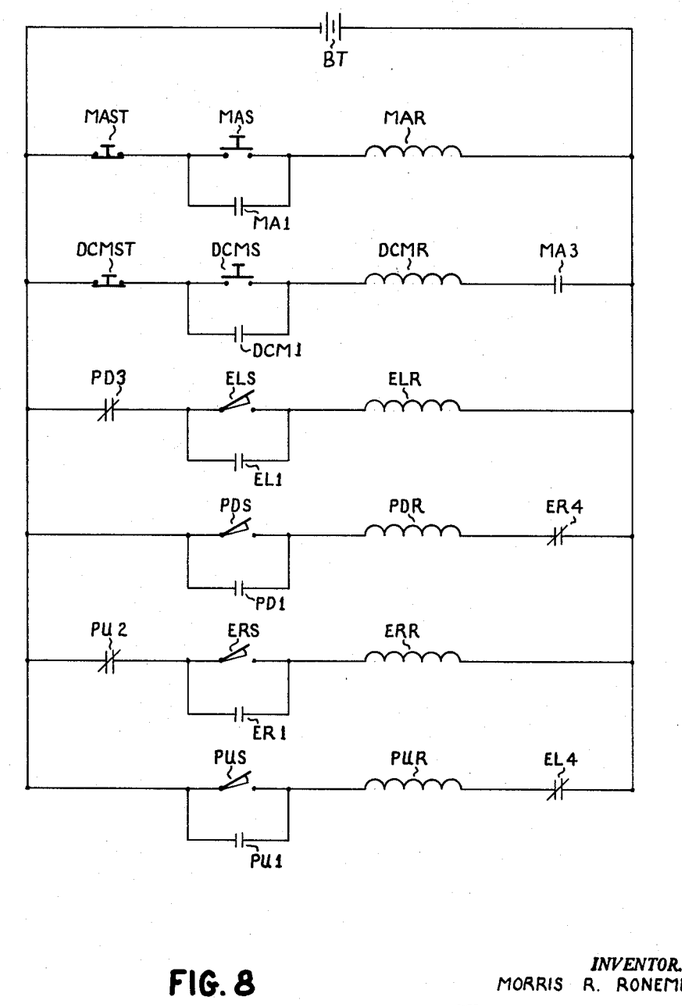
FIGURE 8 shows a control sequencing network which may be utilized in conjunction with the system of FIGURE 6.
Figure 9:
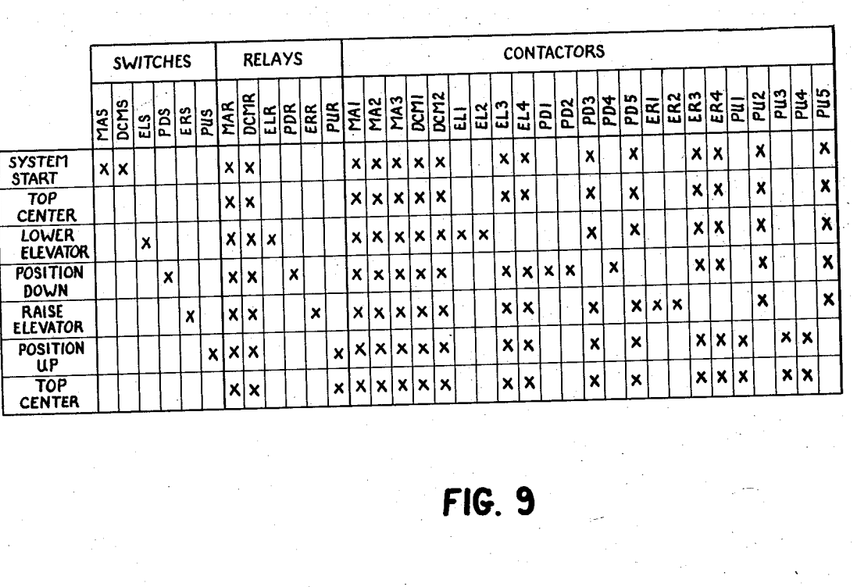
FIGURE 9 is a chart showing the operating sequence of switches, relays and contactors of FIGURES 6 and 8.

The operation of the system of FIG. 6 may be best understood by considering it together with the illustrations of FIGS. 7, 8 and 9 where FIG. 7 graphically illustrates system operation in a similar manner as FIG. 2 with respect to FIG. 1, FIG. 8 illustrates a control network, and FIG. 9 is a switch, relay and contactor sequencing chart.

To initiate operation, switch MAS is closed which energizes relay MAR which picks up contactor MA1 to lock in relay MAR; picks up contactors MA2 to energize motor 106 and picks up contactor MA3 to prepare for closing the amplidyne 105–motor 101 loop. This condition is sustained until stop switch MAST is opened to de-energize relay MAR.

When direct current motor start switch DCMS is closed, relay DCMR is energized to pick up contactor DCM1 to lock relay DCMR in and pick up contactor DCM2 to close the amplidyne motor loop. At this time the amplidyne field regulator input terminals 109a and 109b are connected across the motor speed voltage source, point 116 and point 116a, through contractors PU5, PD6, ER3 and EL3. Since there is zero input to regulator 109, and hence zero field on amplidyne 105, there is no amplidyne output. An operating cycle is commenced by closing elevator lower switch ELS which causes relay ELR to be energized, which picks up contactor EL1 to lock itself in, and picks up contactors EL2 and drops out contactor EL3 to connect potentiometer 112 across reference voltage source 111. The reference voltage at arm 112b of potentiometer 112 is then connected in series with the motor speed voltage source across regulator 109 input terminals 109a and 109b to cause energization of field 107, and hence acceleration of motor 101 towards its regulated speed. This is represented in FIG. 7 by line OH. The motor 101 then runs at its regulated speed as represented by line HI to rotate crank 41 and lower elevator 45.

Prior to or simultaneously with starting of motor 101, switch 54 in depth-sensing device 51 is closed on forward terminals 54a to start motor 52, which turns the rotating member of selsyn 50 with winding 50a thereon. When switch 54 is closed, the depth-sensing device is lowered until probe 56 contacts surface 46a and opens contactor 55 to stop motor 52.

The alternating reference voltage applied to winding 50a induces in windings 50b a voltage having a magnitude proportional to the rotational displacement of winding 50a caused by the depth-sensing device 51. The voltage induced in stator windings 50b is transmittable through contactors PD2 to stator windings 58b of selsyn 58, which will, by generator action, generate a voltage in winding 58a. Inasmuch as the winding 58a is rotated by shaft 40 driven by motor 101, the voltage induced in winding 58a has a magnitude varying with displacement of the rotor of selsyn 58 with respect to the stator. The envelope of the voltage generated in winding 50a thus has a phase angle which has a null at the time at which elevator 45 is to be positioned above surface 46a. Otherwise stated, the phase of the output voltage of discriminator 120 will be shifted by an angle proportional to the depth of surface 46a below reference plane 49. When the voltage generated in winding 58a is applied to discriminator 120, a resultant voltage is produced by discriminator 120 which has a null point related to the position or depth of surface 46a. This is illustrated in FIG. 7 as point J of discriminator output voltage K. It will be apparent that discriminator 120 will not produce the output voltage K until windings 50b are connected to windings 58b through contactors PD2; however, for purposes of illustration, I have shown the voltage wave K as if contactors PD2 were closed at initiation of downward travel.

As the shaft 40, and hence crank 41, are rotated by motor 101, I provide means to sense the position of crank 41 as it drives elevator 45 to the desired position. The sensing means is illustrated as position down switch PDS, which is closed by crank 41 as it moves down. This causes relay PDR to be energized which picks up contactor PD1 to lock itself in; picks up contactors PD2 to connect stator windings 50b of selsyn 50 to stator windings 58b of selsyn 58, contactor PD3 drops out, causing relay ELR to be de-energized which drops out contactors EL1, EL2, and picks up contactors EL3 and EL4. Contactor PD5 drops out and contactor PD4 picks up. This isolates the reference voltage from the regulator input and connects the output terminals 120c and 120d of discriminator 120 in series with points 116 and 116a, defining the motor speed voltage source, across regulator input terminals 109a and 109b. The motor now decelerates along line L, FIG. 7, and comes under control of the discriminator signal K, FIG. 7 at M. As the discriminator signal decreases towards null J, motor speed does likewise until the motor is stopped and elevator 45 is stopped in the selected position. If an external force should tend to move elevator 45 or should the elevator overshoot the selected position, the rotor of selsyn 58 will be displaced causing discriminator 120 to produce a corrective positioning signal.

The elevator 45 is now positioned a selected distance from reference plane 49 and hence the surface 46a and any tool or device carried by elevator 45 is positioned to operate on object 46. In one installation embodying the invention, useful in the meat packing industry, the object 46 is an animal carcass, and the tool carried by elevator 45 is a blade which is drawn across the carcass to remove a predetermined cut of meat therefrom.

After completion of the operation on object 46, which may be signified by suitable sensing means, not shown, or after a predetermined time interval, the elevator is raised by closing of elevator raise switch ERS. This causes relay ERR to be energized, which picks up contactor ER1 to lock itself in. Contactors ER2 are picked up and contactor ER3 is dropped out to connect arm 112b of potentiometer 112 across the voltage source 11 and apply the reference voltage to the input of regulator 109. Contactor ER2 is dropped out to de-energize relay PDR. The motor 101 is then accelerated to its regulated speed, indicated by the line NP, FIG. 7, and runs at its regulated speed, as indicated by line PQ. The motor 101, of course, is driving shaft 40, and hence crank 41. It will be noted that the elevator 45, which was previously positioned to operate on object 46 prior to reaching bottom center, will descend a small distance before moving upward in guides 48 and 49. Normally this will present no problem, inasmuch as the object 46 may be removed prior to moving elevator 45 from its predetermined stop position, or other compensation may be made to prevent undesired interference between elevator 45 and object 46. As the crank is moved towards top center, a sensing means, illustrated as position up switch PUS, will be closed by crank 41. When switch PUS is closed, relay PUR is energized which picks up contactor PU1 to lock itself in, contactor PU2 is dropped out, which de-energizes relay ERR, which causes contactors ER2 to drop out and contactor ER3 to pick up to disconnect the reference voltage source and potentiometer 112b from the input to regulator 109. Contactors PU3 are picked up to connect the stator windings 57b of selsyn 57 to the stator windings 58b of selsyn 58. The discriminator input signal is now derived from the alternating reference voltage applied to non-rotative rotor winding 57a of selsyn 57. Contactor PU4 is closed and contactor PU5 is dropped out to connect the output of discriminator 120 to the input of regulator 109.

The alternating reference voltage induced in stator windings 57b of selsyn 57 by the reference alternating voltage is applied to stator winding 58b of selsyn 58, and hence induced in rotor winding 58a of selsyn 58. Inasmuch as the rotation of rotor winding 58a has been chosen to be an integral number for one revolution of crank 41, the discriminator will furnish an output signal having a null occurring when the crank 41 is at top center. For clarity of illustration, in FIG. 7 I have illustrated discriminator output voltage wave R as it would appear had windings 57b been connected to windings 58b at initiation of downward travel; however, in practice, voltage wave R will only be produced by discriminator 120 when switch PUS is closed, i.e., from point S to point T. Therefore, as motor 105 decelerates along the line U, FIG. 7, at point S the output of discriminator 120 becomes controlling and the motor is made to stop when the discriminator output reaches a null at point T.

From the foregoing discussion, it will be seen that the operation of the system of FIG. 6 is similar to that of FIG. 1; however, in FIG. 6 I have made the additional provision of positioning a driven object at a predetermined position which may be varied in accordance with the position of the object 46 to be operated upon. When the crank 41 is returned to top center, a cycle of operation is completed and the system is prepared for initiation of another cycle, which may be commenced upon a given signal or happening, as illustrated by the closing of elevator lower switch ELS.

At some time subsequent to or simultaneously with raising of elevator 45 after positioning thereof, and prior to commencement of the next cycle, the depth-sensing device 51 is raised and simultaneously therewith reversing switch 54 is reversed to close on contacts 54b so that motor 52 returns the rotor of selsyn 50 to its original position. When the sensing device is raised to its reference level, means, not shown, are provided to open switch 54 to stop motor 52. It is to be realized that many other position-sensing devices other than position-sensing device 52, illustrated, may be utilized. For example, the position of object 46 might be sensed by photoelectric or magnetic means which would cause energization of a motor 52 to predeterminately displace the rotor of selsyn 50. It will be apparent that the arrangement shown in FIG. 1 could be modified in accordance with the disclosure of FIG. 2 to provide a variable predetermined positioning of carriage 4. It is to be further understood that the various position-sensing switches and actuating switches, together with the relay and contactor arrangements which I have illustrated as effecting sequential control operation of the various systems embodying my invention, may be modified for particular installations or have other so called "hardware" substituted therefor.

The systems disclosed provide rapid travel of a driven object towards a predetermined position and positive positioning of the driven object, together with electrical holding means to maintain a positioned object in position. The number of rotations of a selsyn per length of travel are of course determined by the ratio of gearing between the driving means and the selsyn. Similarly, the linear speed of any driven object is determined by motor speed and the gearing therebetween. In one installation embodying the invention, an object is driven 80 inches and positively positioned in 2.4 seconds. Longer lengths of travel would not be proportionately longer inasmuch as the controlling periods are acceleration and deceleration, and traverse is very rapid when the motor is running at regulated speed. It is to be understood that means other than the selsyn arrangements illustrated may be utilized to provide the desired cyclic positioning signal responsive to carriage travel and position in the practice of the invention without departing from the scope thereof.

The illustrated embodiments of the invention, together with the elements illustrated therein, have been selected for purposes of illustration and disclosure. Other modifications and embodiments of the disclosed invention may occur to those skilled in the art which do not depart from the spirit and scope of this invention. Accordingly, it is intended to cover all modifications of the invention and changes in the illustrated embodiments of the invention herein chosen for purposes of disclosure which do not constitute departures from the spirit and scope of the invention.

What I claim as new and desire to secure by Letters Patent of the United States is:

1. An electrical control system for driving and positioning a vertically movable object at a selected point and returning said object to a predetermined raised position, comprising: an electric motor driveably connected to a crank, a link pivotally connected to said crank at one end and pivotally carrying the object at the other end whereby said object is lowered and raised upon 360° rotation of said crank; a power source for supplying electrical energy to said motor and having control means for determining the magnitude of the energy supplied to said motor; means providing a speed reference signal to said control means for accelerating and driving said motor; a selsyn unit having a rotor and stator, means for sensing the selected point with respect to a reference point and displacing the rotor of said selsyn with respect to said stator an angle proportional to the distance between said points; a second selsyn having a rotor and stator, the stators of said selsyns being electrically connectable, the rotor of said second selsyn being driven by said object and having an integral number of revolutions for one revolution of said crank, the rotor of said first selsyn being energizeable with an alternating voltage whereby the voltage generated in the rotor of the second selsyn varies in magnitude with the position of the driven object and has a null corresponding to said selected point; means for detecting the envelope of the voltage generated in the rotor of said second selsyn to produce a cyclic signal varying in magnitude with the position of said object and having a null corresponding to the selected stopping point of said object; means sensing a predetermined length of travel of said object for disconnecting the reference signal from said control means and applying the cyclic signal to said control means whereby said object is positioned at said selected point when the cyclic signal is at a null; a third selsyn unit having a rotor and stator, the rotor of said third selsyn unit being energizeable from the same alternating voltage as the rotor of said first selsyn, the stator of said third selsyn being electrically connectable to the stator of said second selsyn; means for disconnecting said cyclic signal from said control means and for applying the speed reference signal to said control means to raise said object; and means for sensing approach of said object to said raised position for disconnecting the speed reference signal from said control means, connecting the stator windings of said second and third selsyns, and applying the output of said detecting means to said control means to stop said motor when said object is in said raised position.

2. A control system for electrically positioning a motor-driven object to a predetermined position comprising: means responsive to travel of said object for generating a signal which varies cyclically with travel of said object and reaches a null when said object is at said predetermined position; motor control means for accelerating said motor to predetermined speeds in response to an applied speed reference signal; a first speed reference signal; means for applying said first speed reference signal to said motor control means for accelerating said motor toward a first predetermined speed; a second speed reference signal operative when applied to said motor control means for accelerating said motor toward a second slower predetermined speed; first means actuated by said object for sensing a predetermined length of travel of said object, said means being operative to disconnect said first speed reference signal from said motor control means and apply said second speed reference signal thereto at or subsequent to the last negative maximum of said cyclically varying signal; and second means actuated by said object for sensing a second predetermined length of travel of said object, said second means being operative to disconnect said second speed reference signal from said motor control means and apply said cyclically varying signal thereto when said cyclically varying signal is near its positive maximum immediately prior to the selected null.

References Cited in the file of this patent
UNITED STATES PATENTS

| | | |
|---|---|---|
| 2,798,992 | Adler et al. | July 9, 1957 |
| 2,827,602 | Horsfall et al. | Mar. 18, 1958 |
| 2,861,232 | Willems | Nov. 18, 1958 |
| 2,867,759 | Comstock | Jan. 6, 1959 |